United States Patent
Paluncic

(10) Patent No.: US 7,735,608 B2
(45) Date of Patent: Jun. 15, 2010

(54) PROGRESSIVE DISTRIBUTOR COMPRISING DISPLACEABLE PISTONS

(75) Inventor: Zdravko Paluncic, Ludwigshafen (DE)

(73) Assignee: Lincoln GmbH, Walldorf (DE)

( * ) Notice: Subject to any disclaimer, the term of this patent is extended or adjusted under 35 U.S.C. 154(b) by 1344 days.

(21) Appl. No.: 10/257,417

(22) PCT Filed: Aug. 22, 2003

(86) PCT No.: PCT/EP03/09337

§ 371 (c)(1), (2), (4) Date: Mar. 4, 2005

(87) PCT Pub. No.: WO2004/051136

PCT Pub. Date: Jun. 17, 2004

(65) Prior Publication Data

US 2005/0163626 A1      Jul. 28, 2005

(30) Foreign Application Priority Data

Dec. 2, 2002    (DE) ................. 202 18 625

(51) Int. Cl.
*F16N 27/00*      (2006.01)
(52) U.S. Cl. ........................................ 184/7.4
(58) Field of Classification Search ............ 184/7.4, 184/81, 34, 79
See application file for complete search history.

(56) References Cited

U.S. PATENT DOCUMENTS

| | | | |
|---|---|---|---|
| 2,146,424 A | 2/1939 | Dirkes | |
| 3,086,614 A | 4/1963 | Sensui et al. | |
| 3,129,787 A | 4/1964 | Sensui et al. | |
| 3,371,745 A * | 3/1968 | Callahan et al. | 184/7.4 |
| 3,459,278 A | 8/1969 | Callahan | |
| 4,364,452 A | 12/1982 | Crago | |
| 4,502,567 A * | 3/1985 | Karcher | 184/7.4 |
| 4,609,073 A * | 9/1986 | Knaebel | 184/7.4 |
| 4,712,649 A * | 12/1987 | Saam | 184/7.4 |
| 5,311,968 A * | 5/1994 | Pingel | 184/6.4 |

FOREIGN PATENT DOCUMENTS

EP      0 152 901      8/1985

* cited by examiner

*Primary Examiner*—Robert A Siconolfi
*Assistant Examiner*—Vu Q Nguyen
(74) *Attorney, Agent, or Firm*—Wenderoth, Lind & Ponack, L.L.P.

(57) ABSTRACT

A progressive distributor including three or more control pistons (SA to SD), each of which can be displaced in a respective housing bore (A to D) of a distributor housing (G). The pistons are pushed alternately into their two final positions in the corresponding housing bore (A to D) by a lubricant which is supplied under pressure via a housing inlet (E), whereby a specific quantity of the lubricant (VSA to VSD) is delivered by means of an outlet (A1 to A8) on a respective front face. The outlet leads from one of two annular grooves (R) of the housing bore (A to D) of the respective preceding control pistons (SA to SD). The control pistons (SA to SD) are controlled sequentially by the lubricant as a result of the two respective annular grooves (R) in such a way that the following control piston (SA to SD) can only be displaced by the lubricant if the piston displacement of the preceding control piston (SA to SD) has been fully or almost fully completed.

8 Claims, 2 Drawing Sheets

PROGRESSIVE DISTRIBUTOR COMPRISING DISPLACEABLE PISTONS

BACKGROUND OF THE INVENTION

1. Field of the Invention

The invention refers to a progressive distributor with three or more control pistons each of which can be displaced in a housing bore of a distributor housing, which progressive distributor each time with delivery of a specific quantity of lubricant through a frontal outlet, which outlet leads from one of two annular grooves of the housing bore of the respective preceding control piston, from which lubricant fed in under pressure through a housing inlet is alternately pressed into its two final positions in the respective housing bore. The control pistons, through the two annual grooves, are sequentially controlled by the lubricant in such a manner that the next control piston cannot be displaced by the lubricant until the piston displacement of the preceding control piston has been completed or nearly completed. The housing bores are connected with the inlet through a central bore, whereby in each case a channel connects an annular groove of the respective housing bore of the preceding control piston with the front face of the particular housing bore of the next control piston and specifically, except for one control piston, with annular groove and front face on the same side, but in the case of the one control piston with annular groove and front face on opposite sides.

2. Description of Related Art

Such a progressive distributor is known from DE 34 05 690 C2. To design such a progressive distributor with additional functions and thereby make it suitable for novel applications, especially also in those cases where machines must be lubricated with very small quantities or where some lubricating points must be attended to frequently, but others, e.g. only daily, weekly or monthly, it is proposed that in each case a connecting channel connects the respective front faces of at least one housing bore although not of all housing bores with a front face of an additional piston whereby an additional piston is mounted so that it can be moved to and fro between two stops by the lubricant, whereby at least one piston must act against an outlet pressure that is higher than the outlet pressure against which the additional piston acts and whereby for the production of the higher outlet pressure the corresponding outlets feature an overflow valve or a non-return valve with counterpressure. In an alternative solution the arrangement with the overflow valves or non-return valves with counterpressure, the additional piston can have at least one circumferential groove which only releases an outlet of a piston in the two final positions of the additional piston. With such progressive distributors, when the respective piston to whose housing bore the additional cylinder is connected is moved from one side to the other through load on one front face, the outlet assigned to this piston not only delivers the quantity of lubricant displaced by the opposite front face of this piston, but also through displacement of the additional piston from its final position at one end to the opposite end an additional quantity of lubricant corresponding to the free volume of the additional cylinder.

With the one solution the displacement cylinder of the individual pistons pauses long enough until the entire contents of the additional cylinder are emptied, because at least one of these other pistons had to displace itself against an outlet pressure higher than the outlet pressure that the additional piston must overcome allowing for friction losses. With the other solution the additional piston blocks the required outlet for the continuation of the displacement cycle of the pistons long enough until the additional piston has been displaced from its one final position to the other and its circumferential groove releases the required outlet for the continuation of the displacement cycle. The first solution variant has the advantage that the piston can be varied without interrupting the stroke. The second solution variant has the advantage that it works reliably under all pressure conditions, because it does not depend on increased counterpressure at least two opposite outlets of a piston. In both cases the progressive distributor works with the one additional cylinder as a hydraulic timing element, whereby the delay for the continuation of the displacement cycle is determinable or determined by the volume of the additional cylinder.

SUMMARY OF THE INVENTION

The purpose of this invention is to propose a progressive distributor from all of whose outlets or at least several outlets different lubricant volumes can be delivered combined with minimum constructional effort and certain operation.

This purpose is met with a progressive distributor of the type described in the introduction by the fact that in each case a connection channel interconnects the respective front faces of all or at least several housing bores with a front face of the respective assigned bore of a metering piston that can be displaced to and fro by the lubricant between two stops of which at least one is axially adjustable and/or exchangeable and that the displacement resistance of each metering piston assigned to a control piston is smaller than the displacement resistance of the respective following piston.

Advantageously the displacement resistance of the respective metering piston is also smaller than the displacement resistance of its assigned control piston. A determinant for the displacement resistance of the metering piston is its front face under lubricant pressure and therefore also the cross-section of the bores in which the metering pistons are displaceable. In particular, however, the displacement resistance of the respective metering piston can be set by an O-ring arrangement and/or fitting adjustment in its bores.

A constructionally favorable configuration of the progressive distributor invented is obtained if the respective metering piston lies parallel to its assigned control piston and on the side of the distributor housing assigned to the inlet and, specifically, with the exception of one control piston which lies closest to the inlet and whose metering piston lies furthest away from it.

For simple operability it is advantageous if the stops on one front face are immediately adjacent to the exit ports of the corresponding outlet.

It is thereby particularly provided that in opposite front faces of the distributor housing in each instance every second outlet, every second assigned stop and every assigned housing bore for the control pistons are arranged in one of three rows in such a manner that the corresponding distributor housing, outlets and housing bores for the control pistons are positioned immediately adjacent to each other.

To avoid undesired refluxes and/or fouling of the progressive distributor the exit ports of the outlets can be equipped with a non-return valve.

Further aims, features, advantages and application possibilities of the invention will be evident from the following description of embodiments with reference to the drawings. All features described and/or pictorially illustrated constitute in themselves or in any combination the subject of the invention, even independent of their summary in individual claims and their cross-reference.

DETAILED DESCRIPTION OF THE INVENTION

Figure 1:
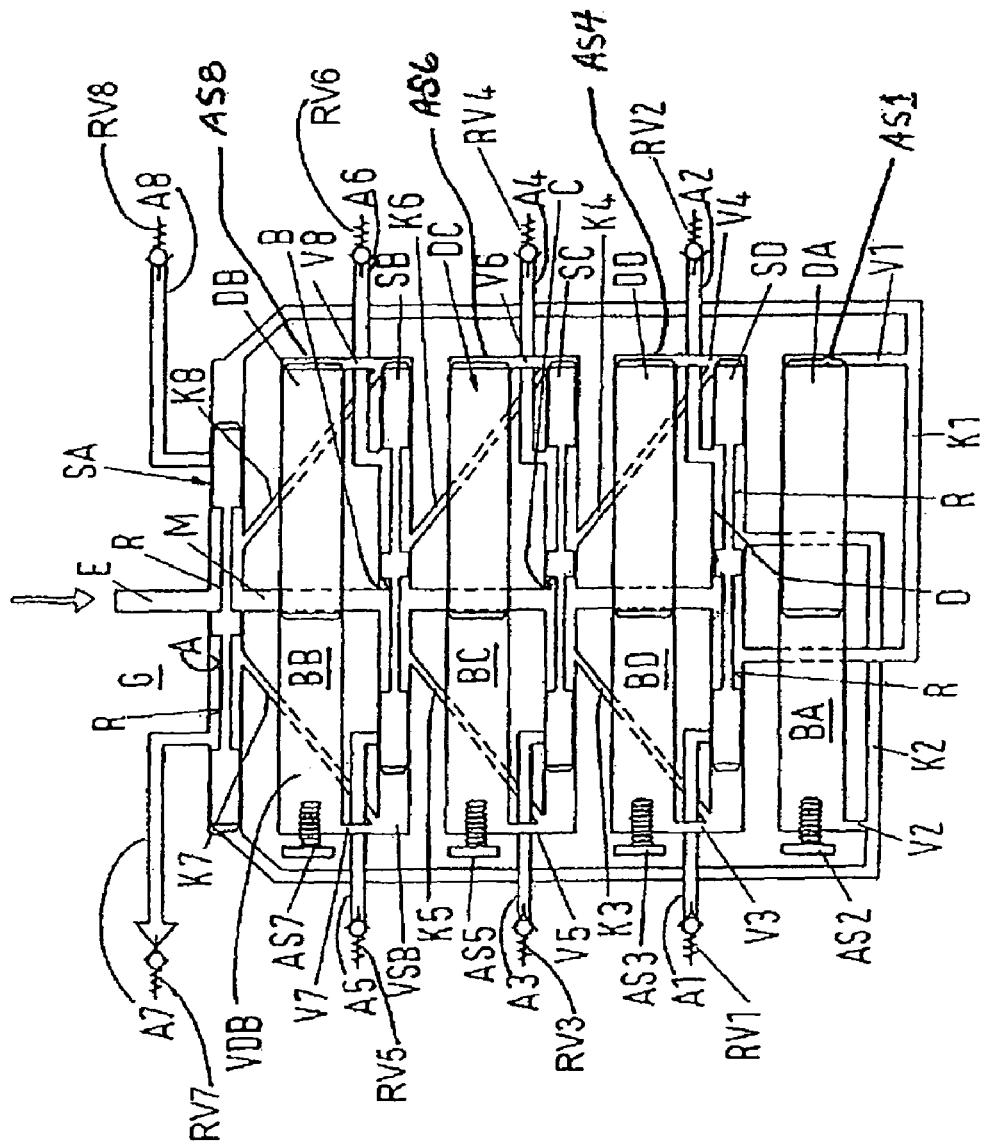
FIG. 1 is a sectional diagram of an embodiment of the progressive distributor.

The embodiment shown in FIG. 1 refers to a progressive distributor with a distributor housing G in which in four housing bores A to D four control pistons SA to SD can be displaced to and fro through lubricant supplied through the inlet E of a central bore M, e.g. by a pump (not shown). The housing bores A to D and the control pistons SA to SD are associated with eight (four on each side) outlets A 1 to A8. Each control piston SA to SD has two annular grooves R axially interspaced from each other. The respective front faces of the housing bores A to D are in flow-through connection with the annular groove R of the corresponding control pistons SA to SD of the preceding housing bore A to D by means of channels K1 to K8. For the top three housing bores A to C, the area of the annular groove R and the front face of the following housing bore D are situated on the same side of the central longitudinal plane (extending perpendicular to the drawing plane from top to bottom). However, the housing bore D of the bottom control piston SD is in flow-through connection in the area of the annular groove R through the channels K1 and K2 with the front face of the bores A to D and the annular groove R of the respective preceding control piston SA to SD. The housing bores A to D are all in communication with the inlet E by way of the central bore M. This arrangement ensures that the control pistons SA to SD are alternately pushed into their two end positions in their housing bores A to D through the effect of the lubricant delivered on the one front face and through delivery of a specific lubricant volume via one of the outlets A1 to A8 on the other side. The respective next control piston SA to SD cannot be displaced by the lubricant until the piston displacement of the preceding control piston SA to SD has been fully or almost fully completed.

Each time a connecting channel V1 connects the respective front face of the housing bores A to b with a front face of the respective assigned bore BA to BD with two end stops AS1 to AS8 of which at least one is axially adjustable and/or exchangeable. In the bores BA to BD one of the metering pistons DA to DD can, in each instance, be displaced to and fro by the lubricant between the stops AS1 to AS8. Thereby the displacement resistance of the particular metering piston DA to DD assigned to the corresponding control piston SA to SD is smaller than the displacement resistance of the respective following control piston SA to SD. Furthermore the displacement resistance of the respective metering piston DA to DD is smaller than the displacement resistance of its corresponding control piston SA to SD. The displacement resistance of the respective metering piston DA to DD is, in the case illustrated, set through fitting adjustment, thereby the respective metering piston DA to DD has a larger frontal effective area than the corresponding control pistons SA to SD.

The displacement resistance can also be set through an O-ring arrangement on the particular metering piston DA to DD.

In the embodiment shown, the respective metering piston DA to DD has an axis that is parallel to its corresponding control piston SA to SD and is situated on the side of the distributor housing assigned to the inlet E, with the exception of one control piston SA which lies closest to the inlet E and whose metering piston DA is furthest away from the inlet E.

Figure 2:
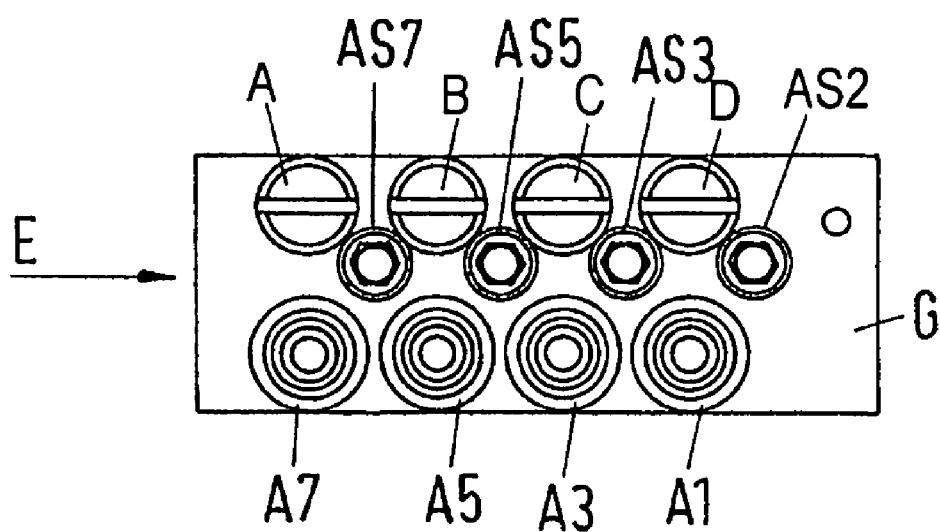
FIG. 2 is a diagrammatic view of a front face of the distributor housing.

As can be seen in FIG. 2 each second outlet A1, A3, A5, and A7, each second corresponding stop AS2, AS3, AS5 and AS7 and each opening of the corresponding housing bores A to D for the control pistons SA to SD are in each case arranged in one of three rows in opposite front faces of the distributor housing G in such a manner that the mutually corresponding outlets A1 to A8, stops AS2, AS3, AS5 and AS7 and housing bores A to D for the control pistons SA to SD are immediately adjacent to each other for easy operation.

FIG. 1 shows that the exit ports of the outlets A1 to A8 may be equipped with a non-return valve RV1 to RV8.

If, for example, in the position of control pistons SA to SD and metering pistons DA to DD shown in FIG. 1, lubricant is fed into the central bore M via the inlet E, it moves to the right front face of the control piston SB via the annular groove R of the control piston SA and via the connecting channel V8 to the right front face of the metering piston DB which is consequently pushed to the left in its respective bores B and BB. The displaced lubricant volume VSB and VDB is delivered to the outlet A7 by means of the connecting channel W via the channel K7 and the left annular groove R of the control piston SA. As can be seen, the lubricant volume VDB that can be displaced by the metering piston DB is determined by the variable axial position of the stop A7 and is therefore variable.

If both the control piston SB and the metering piston DB have been displaced as far as possible to the left, the same movement of the control piston SC and the metering piston DC is continued by means of the annular groove of the next control piston SB and the channel K6 etc. Because of the transposition of the channels K1 and K2 to the respective annular groove R of the control piston SD on the opposite side, the movements of all pistons reverse as soon as all pistons SA to SD and metering pistons DA to DD in the drawing have been displaced to the left etc.

It is obvious that an adjustable stop can also be provided on the right side of the bores BA to BD for the metering pistons DA to DD shown in the drawing in order to provide on this side also a variable displaced lubricant volume.

The invention claimed is:

1. A progressive distributor comprising:
   a distributor housing having a housing inlet, a plurality of housing bores, and a plurality of outlets in communication with the housing bores, respectively;
   a plurality of control pistons disposed in the housing bores, respectively, each of the control pistons can be sequentially displaced in the respective housing bore of the distributor housing, wherein each of the control pistons has two annular grooves, and each of the control pistons can be pushed into two final positions in the respective housing bore by a lubricant that is supplied under pressure via the housing inlet,
   wherein a specific quantity of lubricant can be delivered by means of one of the outlets on an outer face of the distributor housing, and each of the outlets communicates with one of the annular grooves of the respective control piston,
   wherein each of the control pistons is controlled sequentially by the lubricant so that a succeeding one of the control pistons cannot be displaced by the lubricant until the control piston displacement of the preceding control piston has been fully completed,
   wherein said housing bores are connected to the housing inlet via a central bore,
   wherein for each control piston, a channel connects one of the annular grooves of the control piston to an end face of the respective housing bore of the following control piston, wherein for all but one of the control pistons, the annular groove and the end face lie on the same side, but for the one of the control pistons the annular groove and the end face lie on opposite sides; and a plurality of metering pistons, each of which is displaceable in a metering piston bore formed in the housing, wherein connection channels interconnect the end faces of the housing bores with end faces of the metering piston bores of the metering pistons, respectively, wherein each of the metering pistons can be reciprocated by the lubricant between two stops, at least one of the stops is axially displaceable, and a displacement resistance of each of the metering pistons assigned to the control pistons is smaller than a displacement resistance of the respective following control piston.

2. A progressive distributor as claimed in claim 1, wherein a displacement resistance of each of the metering pistons is smaller than a displacement resistance of the assigned control piston.

3. A progressive distributor as claimed in claim 1, wherein a displacement resistance of the metering pistons can be adjusted by means of an O-ring arrangement and/or a fitting adjustment.

4. A progressive distributor as claimed in claim 1, wherein each of the metering pistons has a larger effective area than its assigned control piston.

5. A progressive distributor as claimed in claim 1, wherein each of the metering pistons has an axis that is parallel to its assigned control piston, and the metering piston lies on a side of the assigned control piston that is nearest a side of the distributor housing that includes the housing inlet with the exception of the one of the metering pistons that is disposed furthest away from the housing inlet as its assigned control piston is positioned closest to the housing inlet.

6. A progressive distributor as claimed in claim 1, wherein for each of the metering piston bores at least one of the two stops is arranged immediately adjacent to one of the outlets in communication with the housing bores.

7. A progressive distributor as claimed in claim 1, wherein in at least one face of the distributor housing, the housing bores are arranged in a first row, stops associated with the metering piston bore are arranged in a second row, and the outlets of the housing bores are arranged in a third row.

8. A progressive distributor as claimed in claim 1, wherein exit ports of the outlets are equipped with non-return valves, respectively.

* * * * *